(12) United States Patent
Cho

(10) Patent No.: US 9,996,252 B2
(45) Date of Patent: Jun. 12, 2018

(54) DISPLAY DEVICE FOR EXECUTING PLURALITY OF APPLICATIONS AND METHOD OF CONTROLLING THE SAME

(71) Applicant: Samsung Electronics Co., Ltd., Gyeonggi-do (KR)

(72) Inventor: Sung-Jae Cho, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/610,989

(22) Filed: Jun. 1, 2017

(65) Prior Publication Data

US 2017/0269813 A1    Sep. 21, 2017

Related U.S. Application Data

(62) Division of application No. 14/183,726, filed on Feb. 19, 2014.

(30) Foreign Application Priority Data

Mar. 29, 2013    (KR) .................. 10-2013-0034042

(51) Int. Cl.
  *G06F 3/048*    (2013.01)
  *G06F 3/0488*   (2013.01)
  *G06F 3/0481*   (2013.01)

(52) U.S. Cl.
  CPC .......... *G06F 3/0488* (2013.01); *G06F 3/0481* (2013.01); *G06F 3/04886* (2013.01)

(58) Field of Classification Search
  CPC .................................................. G06F 3/0481
  See application file for complete search history.

(56) References Cited

U.S. PATENT DOCUMENTS

| | | | |
|---|---|---|---|
| 5,694,150 A | 12/1997 | Sigona et al. | |
| 6,426,762 B1 | 7/2002 | Nason et al. | |
| 8,745,525 B1* | 6/2014 | Roskind ............... | G06F 3/0481 715/788 |
| 2007/0226636 A1 | 9/2007 | Carpenter et al. | |
| 2008/0158145 A1 | 7/2008 | Westerman | |
| 2009/0228792 A1 | 9/2009 | van Os et al. | |
| 2010/0217604 A1 | 8/2010 | Baldwin et al. | |
| 2012/0030568 A1* | 2/2012 | Migos ................... | G06F 3/0486 715/702 |
| 2012/0210275 A1* | 8/2012 | Park ..................... | G06F 3/04883 715/810 |
| 2013/0038627 A1* | 2/2013 | Mujkic ................. | G06F 9/4443 345/619 |
| 2013/0069899 A1 | 3/2013 | Beaver et al. | |

FOREIGN PATENT DOCUMENTS

JP    2009-211704 A    9/2009

\* cited by examiner

*Primary Examiner* — Matthew Ell
(74) *Attorney, Agent, or Firm* — Cha & Reiter, LLC

(57) ABSTRACT

In one aspect, method is provided for controlling a display device, comprising: displaying, on a touchscreen display, a first window executing a first application and a second window executing a second application; receiving, at the touchscreen display, a first command input to the first window and a second command input to the second window; determining whether the first command and the second command are received simultaneously; dispatching, by a processor, the first command; and dispatching, by the processor, the second command.

15 Claims, 13 Drawing Sheets

DISPLAY DEVICE FOR EXECUTING PLURALITY OF APPLICATIONS AND METHOD OF CONTROLLING THE SAME

CROSS REFERENCE TO RELATED APPLICATIONS

This application is a Divisional of U.S. patent application Ser. No. 14/183,726 filed on Feb. 19, 2014 which claims priority under 35 U.S.C. § 119(a) to Korean Application Serial No. 10-2013-0034042, which was filed in the Korean Intellectual Property Office on Mar. 29, 2013, the entire content of which is hereby incorporated by reference.

BACKGROUND

1. Technical Field

The present disclosure relates generally to a display device for executing a plurality of applications and a method of controlling the same, and more particularly, to a display device for controlling a display of a window in which a plurality of applications is executed and a method of controlling the same.

2. Description of the Related Art

A desktop computer may have multiple display devices (e.g., multiple monitors, while a mobile device may have only one display device (e.g., a touch screen). A user of a desktop computer may divide a screen of the desktop computer's display device according to a working environment (for example, horizontally or vertically divide the screen while displaying a plurality of windows) and use the divided screens. When a web browser is executed, the user can move a web page displayed by the web browser in an up or down direction by using a page up button or a page down button arranged in a keyboard. When the user uses a mouse instead of the keyboard, the user can move the web page in the up or down direction by selecting a scroll bar located in a side part of the web page by using a cursor or by selecting a top button displayed as a text or an icon located in a bottom part of the web page.

In contrast to desktop computers, mobile devices tend to have smaller screen sizes. The smaller screen sizes make it more difficult to divide portable device screens among multiple applications. Although various applications which simulate consumers' curiosity and satisfy consumers' demands may be provided on a given mobile device, the limited screen size and a User Interface (UI) and User Interface (UI) of that device may make it inconvenient to execute a plurality of applications in the mobile device at the same time. For example, when one application is executed in a given mobile device, the application may be displayed in an entire display area. When the user desires to execute another application, the user should first end the currently executed application and then select an execution key for executing the desired application. That is, in order to execute several applications in the mobile device, processes of executing and ending the respective applications may need to be repeated, which in turn could make the user feel inconvenienced.

Furthermore, mobile devices have more limited User Interface (UI) facilities than desktop computers. For example, when a plurality of applications are displayed in device desktop computer, commands may be simultaneously input into different applications from the plurality. By contrast, display controls of mobile devices may be configured to route all commands input into the mobile devices' touchscreen to only one application—namely, the application whose window has the highest activity order. Accordingly, the user of a given mobile device cannot simultaneously use all windows that are displayed on the device's screen at the same time.

The above limitation may become more noticeable when a plurality of users need to control different windows on the same display device (e.g., touch screen), as it could prevent each of the users from interacting with his or her respective application(s) freely. When the plurality of users input commands into windows, respectively, the window having the highest activity order receives all the commands, so that only one of the applications can be controlled to the exclusion of all others.

SUMMARY

The present invention has been made to solve the above mentioned problems and provides additional advantages, by providing a display device for, when commands are input into a plurality of windows, respectively, inputting an individual command into each of the windows, and a method of controlling the same.

In one aspect, method is provided for controlling a display device, comprising: displaying, on a touchscreen display, a first window executing a first application and a second window executing a second application; receiving, at the touchscreen display, a first command input to the first window and a second command input to the second window; determining whether the first command and the second command are received simultaneously; dispatching, by a processor, the first command; and dispatching, by the processor, the second command.

In another aspect, a display device for executing an application is provided, the display device comprising a touch screen coupled to controller. The touch screen is configured to display a first window executing a first application and a second window executing a second application, receive a first command input to the first window and a second command input to the second window, the first command and the second being received simultaneously. The controller is configured to match a position of the first window with an input position of the first command, match a position of the second window with an input position of the second command, dispatch the first command based on whether the position of the first window is determined to match the first command, and dispatch the second command based on whether the position of the second window is determined to match the second command.

In yet another aspect, a method is provided for controlling a display device, the method comprising: displaying a plurality of windows, each window executing a different application; receiving a plurality of commands that are input into the plurality of windows, each command being received at a different window, wherein the commands are received simultaneously; and dispatching, by a processor, each of the commands to a different one of the plurality of windows.

In yet another aspect, a display device for executing applications is provided, the display device comprising a touchscreen coupled to a controller. The touchscreen is configured to display a plurality of windows executing applications. The controller is configured to receive a plurality of commands that are input into the plurality of windows, each command being received at a different window, wherein the commands are received simultaneously; dispatch each of the commands to a different one of the plurality of windows.

In yet another aspect, a method for controlling a display device is provided, the method comprising: receiving commands directed to a first application and a second application, the first application being executed in a first window and the second application being executed in a second window; determining, by a processor, a position of the first window and a position of the second window, the determining being performed by the kernel of an operating system executed by the processor; displaying the first window and the second window; receiving a first command input to the first window and a second command input to the second window, the first command and the second command being received simultaneously; matching an input position of the first command with the position of the first window, the matching being performed by the kernel of the operating system; matching an input position of the second command with the position of the second window, the matching being performed by the kernel of the operating system; outputting a first event corresponding to the first command based on the matching; and outputting a second event corresponding to the second command based on the matching.

In yet another aspect, a method for controlling a display device is provided, the method comprising: receiving commands directed to a first application and a second application, the first application being executed in a first window and the second application being executed in a second window; determining, by a processor, a position of the first window and a position of the second window, the determining being performed at a platform level; displaying the first window and the second window; receiving a first command input to the first window and a second command input to the second window, the first command and the second command being received simultaneously; matching an input position of the first command with the position of the first window, the matching being performed at the platform level; matching an input position of the second command with the position of the second window, the matching being performed at the platform level; outputting a first event corresponding to the first command based on the matching; and outputting a second event corresponding to the second command based on the matching.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
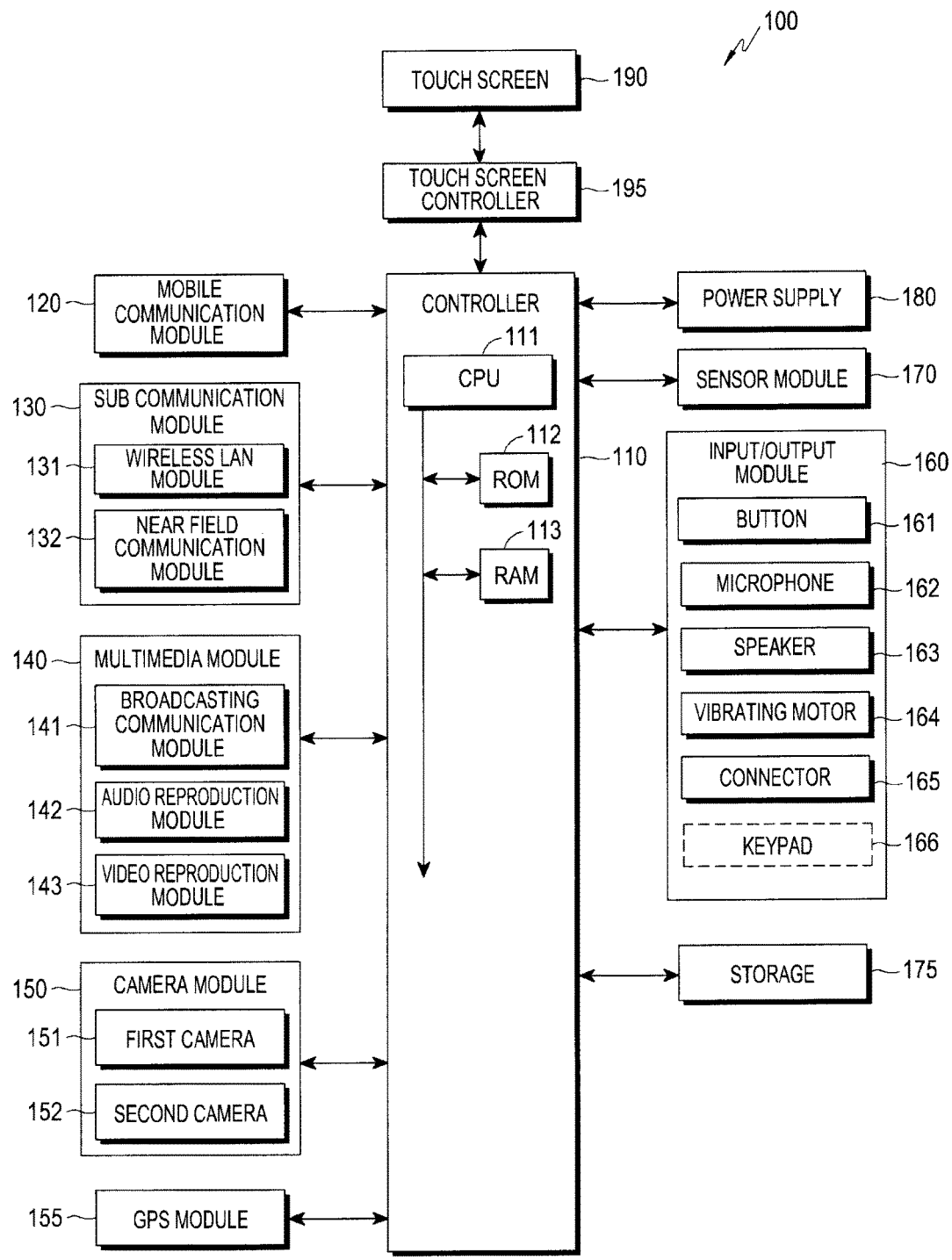
FIG. 1 is a block diagram of a display device according to aspects of the disclosure.

Hereinafter, aspects of the disclosure will be presented with reference to descriptions discussed through the accompanying drawings. However, the disclosure is not limited or restricted by the examples presented therein. The same reference numerals shown in respective drawings indicate members for substantially performing the same function.

FIG. 1 depicts a block diagram of a display device 100 according to aspects of the disclosure. The display device 100 may include a mobile device, such as a smart phone, a tablet computer (with or without cellular capability), a non-mobile device, such as a desktop computer, a TV display, and or any other suitable type of device. The display device 100 may be connected to an external device (not shown) by using a mobile communication module 120, a sub communication module 130, and a connector 165. The "external device" may include a different device (not shown) from the display device 100, a mobile phone (not shown), a smart phone (not shown), a tablet PC (not shown), and a server (not shown).

The display device 100 may include a touch screen 190 and a touch screen controller 195. Also, the display device 100 may include a controller 110, a mobile communication module 120, the sub communication module 130, a multimedia module 140, a camera module 150, a GPS module 155, an input/output module 160, a sensor module 170, a storage unit 175, and a power supply 180.

The controller 110 may include a CPU 111, a read-only memory (ROM) 112 for storing a control program for controlling the display device 100, and a random access memory (RAM) 113. The RAM 113 may be used to store a signal or data that is input into the display device 100 and/or intermediate data generated as a result of operations performed in the display device 100. The CPU 111 may include a single core, a dual core, a triple core, a quad core, and/or any other suitable type of CPU. The CPU 111, the ROM 112, and the RAM 113 may be connected through an internal bus. The controller 110 may control the mobile communication module 120, the sub communication module 130, the multimedia module 140, the camera module 150, the GPS module 155, the input/output module 160, the sensor module 170, the storage unit 175, the power supply 180, the touch screen 190, and the touch screen controller 195.

The mobile communication module 120 may connect the display device 100 with the external device through mobile communication by using at least one or a plurality of antennas (not shown). The mobile communication module 120 may transmit/receive wireless signals for voice phone communications, video phone communications, Short Message Service (SMS) communications, or Multimedia Message Service (MMS) communications and/or any suitable type of communications with another similar device.

The sub-communication module 130 may include at least one of the wireless LAN module 131 and the near field communication module 132. For example, the sub communication module 130 may include only the wireless LAN module 131, only the near field communication module 132, or both the wireless LAN module 131 and the near field communication module 132. The wireless LAN module 131 may be connected to the Internet via a wireless Access Point (AP) (not shown). The wireless LAN module 131 may support a wireless LAN standard (IEEE802.11x) of the Institute of Electrical and Electronics Engineers (IEEE). The near field communication module 132 may wirelessly perform near field communications between the display device 100 and a image forming device (not shown). Near field communication techniques may include Bluetooth, Infrared Data Association (IrDA) and the like.

The display device 100 may include one or more of the mobile communication module 120, the wireless LAN module 131, and the near field communication module 132. For example, the display device 100 may include a combination of the mobile communication module 120, the wireless LAN module 131, and the near field communication module 132.

The multimedia module 140 may include one or more the broadcasting communication module 141, the audio reproduction module 142, and the video reproduction module 143. The broadcasting communication module 141 may receive a broadcasting signal (for example, a TV broadcasting signal, a radio broadcasting signal, or a data broadcasting signal). In addition, the broadcasting module 141 and broadcasting additional information (for example, Electric Program Guide (EPS) or Electric Service Guide (ESG)) broadcasted from a broadcasting station through a broadcasting communication antenna (not shown) according to a control of the controller 110. The audio reproduction module 142 may reproduce a digital audio file (for example, a file having an extension of mp3, wma, ogg or way) stored or received according to a control of the controller 110. The video reproduction module 143 may reproduce a digital video file (for example, a file having an extension of mpeg, mpg, mp4, avi, mov or mkv) stored or received according to a control of the controller 110. The video reproduction module 143 may reproduce the digital audio file.

The camera module 150 may include at least one of the first camera 151 and the second camera 152. Although not shown, the camera module 150 may also include an auxiliary light source (for example, a flash (not shown)) for providing an amount of light required for the photographing. By way of example, the first camera 151 may be disposed in a front surface of the display device 100, and the second camera 152 may be disposed in a rear surface of the display device 100. As another example, the first camera 151 and the second camera 152 may be disposed to be, so as to permit the of three-dimensional images or video.

The GPS module 155 may receive a radio wave from a plurality of GPS satellites (not shown) in Earth orbit and calculate a position of the display device 100 by using Time of Arrival from the GPS satellites (not shown) to the display device 100.

The input/output module 160 may include at least one of the plurality of buttons 161, the microphone 162, the speaker 163, the vibration motor 164, the connector 165, and the keypad 166. The buttons 161 may be formed in a front surface, a side surface, or a rear surface of the housing of the display device 100, and may include at least one of a power/lock button (not shown), a volume button (not shown), a menu button, a home button, a back button, and a search button 161. The microphone 162 may receive voice or other audio and generate an electrical signal according to a control of the controller 110. The speaker may include one or more speakers disposed in a proper position or positions in the housing of the display device 100. Any suitable type or number of speakers may be used. Vibration motor 164 may include one or more vibration motors disposed within the housing of the display device 100. Each of the vibration motor 164 may convert an electrical signal to a mechanical vibration. For example, when the display device 100 receives an incoming call, the vibration motor 164 may activate so as to notify the user of the call. As another example, the vibration motor 164 may operate in response to a touch action of the user on the touch screen 190 and continuous motions of the touch on the touch screen 190.

The connector 165 may include an interface (e.g., a USB interface or any other suitable type of interface) for connecting the display device 100 with an external device (not shown) or a power source (not shown). The connector 165 may transmit data stored in the storage unit 175 of the display device 100 to the external device (not shown) through a wired cable connected to the connector 165 or receive the data from the external device (not shown). Power may be input or a battery (not shown) may be charged from the power source (not shown) through the wired cable connected to the connector 165.

The keypad 166 may include a physical keypad (not shown) formed in the display device 100 and/or a virtual keypad (not shown) displayed on the touch screen 190. In this example, the keypad 166 may be a virtual keypad. The sensor module 170 may include at least one sensor for detecting a state of the display device 100. For example, the sensor module 170 may include a proximity sensor for detecting whether the user is close to the display device 100, an illumination sensor (not shown) for detecting an amount of light adjacent to the display device 100, or a motion sensor (not shown) for detecting an operation of the display device 100 (for example, a rotation of the display device 100, or an acceleration or vibration applied to the display device 100). At least one sensor may detect a state of the display device, generate a signal corresponding to the detection, and transmit the generated signal to the controller 110. Sensor module 170 may include any suitable type and/or number of sensors.

The storage unit 175 may store signals or data input/output as a result of the operation of the mobile communication module 120, the sub communication module 130, the multimedia module 140, the camera module 150, the GPS module 155, the input/output module 160, the sensor module 170, and the touch screen 190 according to a control of the controller 110. The storage unit 175 may store a control program (that is executed by controller 110) for controlling the display device 100 or the controller 110 and applications. The storage unit 175 may include a memory card (not shown) (for example, an SD card or a memory stick) mounted to the storage unit 175, the ROM 112 or the RAM 113 within the controller 110, or the display device 100, nonvolatile memory, volatile memory, a Hard Disk Drive (HDD), or a Solid State Drive (SSD).

The power supply 180 may include a battery and/or other circuitry for supplying power to the display device 100. Further, the power supply 180 may receive power from an external power source (not shown) through the wired cable connected to the connector 165 to the display device 100.

The touch screen 190 may be a resistive type of touch screen, a capacitive type of touch screen, an infrared type of touch screen, an acoustic wave type of touch screen, and/or any other suitable type of touch screen. The touch screen 190 may provide a user interface for accessing various services, such as telephony services, data transmission, data broadcasting, camera services to the user. The touch screen 190 may transmit an analog signal corresponding to at least one touch input into the user interface to the touch screen controller 195. The touch screen 190 may receive at least one touch through a body part of the user (for example, fingers including a thumb) or a touchable input means. Also, the touch screen 190 may receive a continuous motions as input and may transmit an analog signal corresponding to the continuous motions to the touch screen controller 195.

The touch according to the present invention is not limited to a touch between the touch screen 190 and the body part of the user or the touchable input means, but may include a non-touch (for example, a case where a detectable interval between the touch screen 190 and the body part of the user or the touchable input means is equal to or smaller than 1 mm). The detectable interval of the touch screen 190 may be changed according to a capability of a structure of the display device 100.

The touch screen controller 195 may include circuitry for converting an analog signal received from the touch screen 190 to a digital signal (for example, X and Y coordinates). The digital signal may be provided to the controller 110 which may in turn change the state of the touch screen 190 based on the digital signal. For example, the controller 110 may allow a shortcut execution icon (not shown) displayed on the touch screen 190 to be selected or executed in response to the touch. In some implementations, the touch screen controller 195 may be integrated into the controller 110.

Figure 2A:
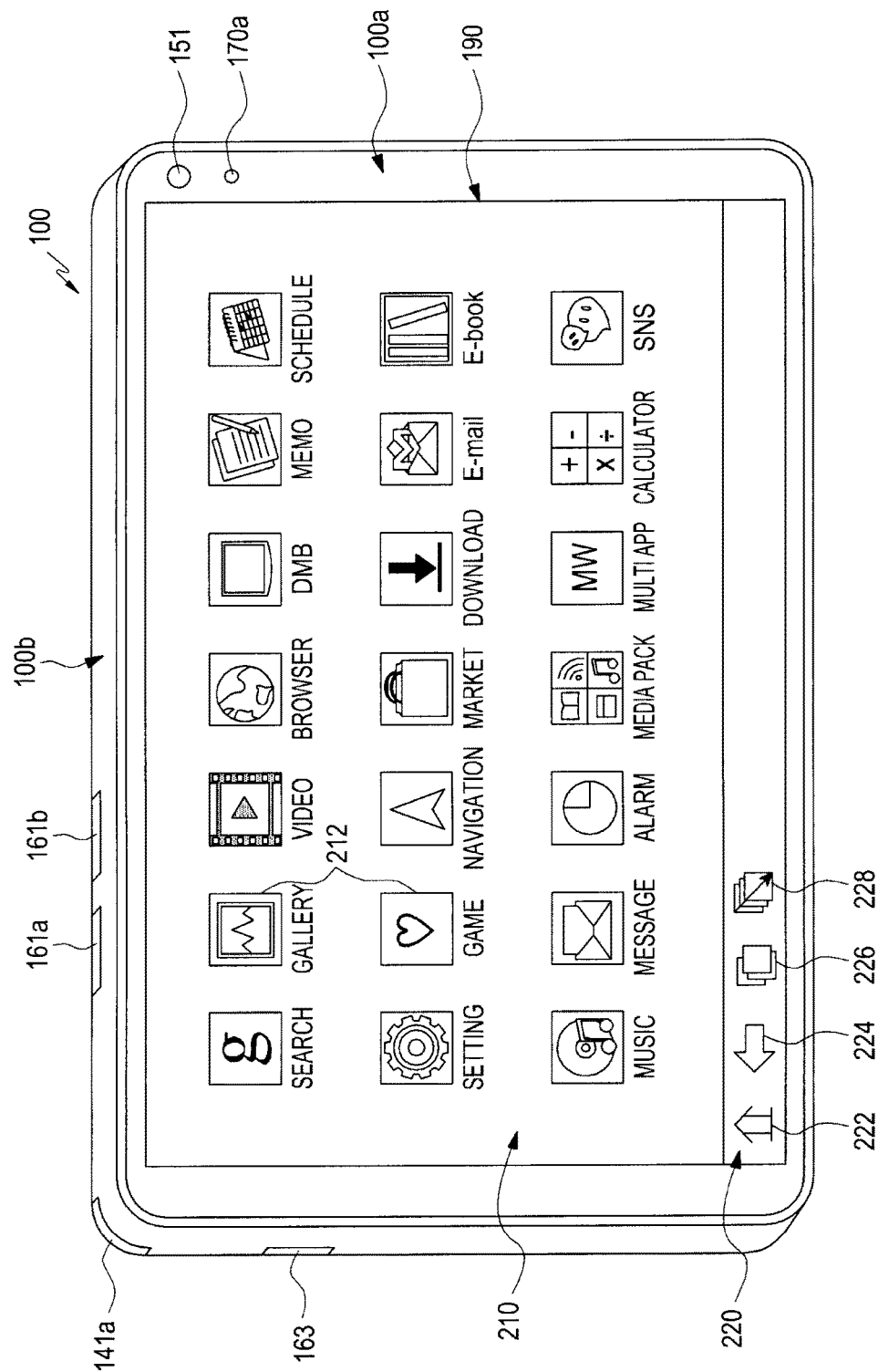
FIG. 2A is a schematic diagram of the display device in accordance with aspects of the disclosure.

FIG. 2A is a schematic diagram of the device 100 in accordance with aspects of the disclosure. Referring to FIG. 2A, the touch screen 190 is disposed in a center of a front surface 100a of the display device 100, covering a substantial portion of the area of the front surface 100a of the display device 100. The first camera 151 and an illumination sensor 170a may be disposed in an edge of the front surface 100a of the display device 100. For example, a power/reset button 161a, a volume button 161b, the speaker 163, a terrestrial DMB antenna 141a, the microphone (not shown), the connector (not shown) and the like may be disposed on the side surface 100b of the display device 100, and the second camera 152 (not shown) may be disposed on the rear surface (not shown) of the display device 100.

The touch screen 190 may include a main screen 210 and a lower bar 220. In the example of FIG. 2A, the touch screen 190 is horizontally arranged and as such, the display device 100 and the touch screen 190 may have a horizontal length larger than a vertical length. In other examples, the touch screen 190, however, may be vertically arranged.

In some aspects, the main screen 210 may include an area where one application or a plurality of applications are executed. FIG. 2A shows an example where a home screen is displayed on the touch screen. 190. The home screen may be the first screen displayed on the touch screen 190 when the display device 100 is turned on. Execution keys 212 for executing a plurality of applications stored in the display device 100 may be arranged on the home screen in rows and columns. The execution keys 212 may be formed in icons, buttons, texts or the like. When an execution key 212 is touched, an application corresponding to the touched execution key 212 may be executed and then displayed on the main screen 196.

The lower bar 220 may stretch along the lower end of the touch screen 190 and may include a home screen button 222, a back button 224, a multi-view mode button 226, and a mode switching button 228. In one aspect, pressing the home screen movement button 222 may cause the home screen to be displayed on the main screen 210. In another aspect, pressing the back button 224 may cause a display a screen executed just before a currently executed screen to be presented on the main screen. Additionally or alternatively, pressing the back button 224 may cause an application most recently used to be terminated. In yet another aspect, pressing the multi-view mode button 226 may cause a plurality of applications to be displayed on the main screen 210 in a multi view mode. In yet another aspect, pressing the mode switching button 228 may change the mode in which currently executed applications are displayed on the main screen 210. For example, when the mode switching button 228 is touched, a switch is performed between a freestyle mode and a split mode. The freestyle and split modes are discussed further below.

In some implementations, an upper bar (not shown may be include) to display battery information and/or other types of information. Additionally or alternatively, in some implementations, the lower bar 220 may be omitted thus causing the main screen 210 may occupy the entire area of the touch screen 190. Furthermore, in some implementations, the lower bar 220 and the upper bar (not shown) may be translucently displayed on the main screen 196 while overlapping each other.

Figure 2B:
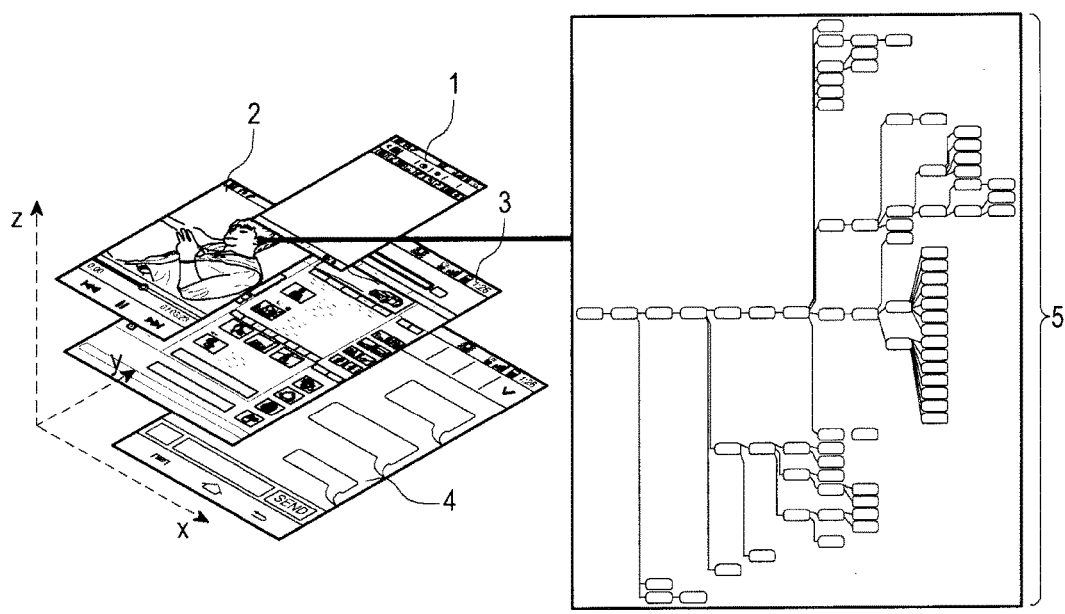
FIG. 2B is a schematic diagram illustrating a Z-order arrangement of active application windows.

FIG. 2B is a schematic diagram illustrating a Z-order arrangement of active application windows. As illustrated, under the Z-order arrangement, the screen may be divided into N layers, such that the $N^{th}$ layer is associated with a higher rank than the $N-1^{th}$ layer. Each layer may have a corresponding window and each application may be executed on the corresponding window. For example, when a first application is executed, the first application may be executed in the window on a first layer. Similarly, when a second application is executed, the second application may be executed in the window on a second layer. And when a third application is executed, the third application may be executed in the window on a third layer. The layers on which applications are generated may be hierarchically generated and they may permit a plurality of windows (first to fourth windows) to be overlapping displayed on the main screen 210. More specifically, a first window 1 may be displayed on top of a second window 2; the second window 2 may be displayed on top of a third window 3; and the third window 3 may be displayed on top of a fourth window 4. Thus, when the plurality of windows 1 to 4 overlap (at least partially), they may have a display order with respect to the z-axis, herein referred to as a Z-order, which determines which window(s) are displayed on top of the rest A layer viewer 5 may be a screen in which Z-order is hierarchized and then displayed.

Figure 3A:
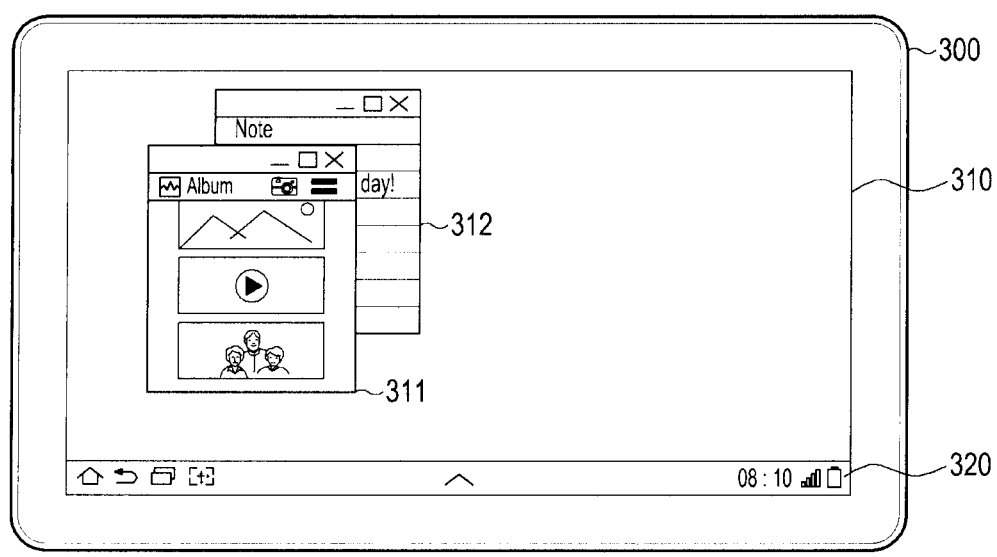
FIG. 3A is a diagram of a window displaying screen presenting a plurality of applications in a freestyle mode according to aspects of the disclosure.

FIG. 3A is a diagram of a window displaying screen presenting a plurality of applications in a freestyle mode according to aspects of the disclosure. In some aspects, the freestyle mode may include a display mode in which the plurality of windows 311 and 312 are overlappingly displayed based on their display order. As illustrated in FIG. 3A, a display device 300 may include a touch screen 310. A plurality of windows 311 and 312 may be displayed on the touch screen 310. Further, a lower bar 320 may be displayed in a lower end of the touch screen 310. Each of windows the 311 and 312 may include an execution screen of a particular application, a title bar for the executed application, and/or a control area. Objects related to the application may be displayed on the execution screen of the application. The objects may include text, an image, a button, a check box, a picture, a video, a web, a map and the like. When a user touches an object, a function or event associated with that object may be performed in the object's corresponding application. The object may be called a "view" according to an operating system. The title bar may include at least one control key for controlling a display of the window. For example, the control key may be a window display minimizing button, a window display maximizing button, or a window ending button.

Meanwhile, applications are programs independently implemented by a manufacturer of the display device 300 or an application developer. Accordingly, a pre-execution of one application is not required to execute another application. Further, although one application ends, another application can be continuously executed.

The applications are distinguished from a complex function application (or dual application) generated by adding some functions (memo function and message transmission/reception function) provided by another application to functions of one application in that the applications are independently implemented programs. However, the complex function application is a single application newly produced to have various functions and thus has differences from conventional applications. Accordingly, the complex function application provides only limited functions without providing various functions unlike the conventional applications. Further, users have the burden of separately purchasing such a new complex function application.

The controller 110 may control the display of the windows 311 and 312. In some aspects, the controller 110 can set a display rank for the windows 311 and 312. For example, the controller 110 can set a first display rank for the window 311 and a second display rank for the window 312. Moreover, the controller 110 may cause windows having a relatively higher display rank, such as window 311, to be superimposed on windows that have a lower display rank, such as window 312.

In some aspects, the controller 110 may assign the display rank of windows 311 and 312 according to the (relative) timing of control events that are input into windows 311 and 312. For example, the controller 110 may give a highest display rank to the window in which a control event is last input. As another example, when the user touches the window 311, the controller 110 may give the highest display rank to the window 311. Afterwards, when the user touches the window 312, the controller 110 may give the highest display rank to the window 312. Stated succinctly, in some aspects, the rank may be a number, a string, and/or another type of indication that is assigned to application windows by controller 110 and used to determine the Z-order in which the application windows are displayed.

Figure 3B:
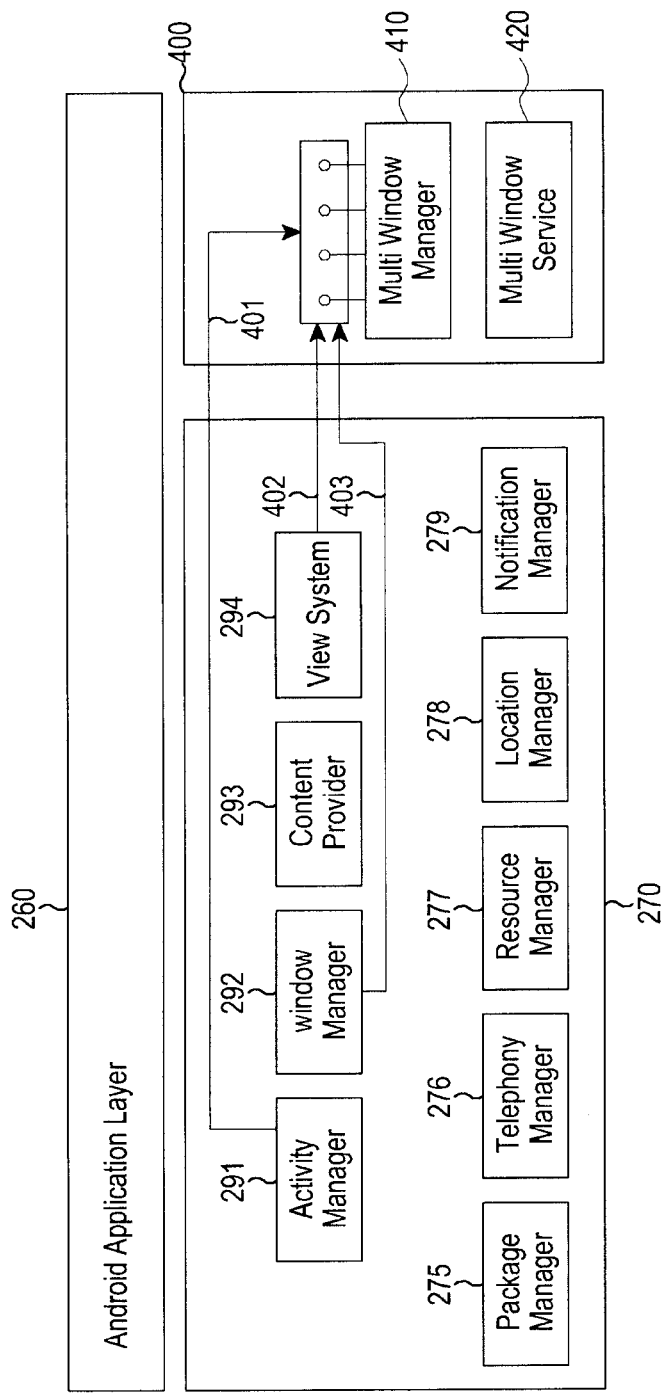
FIG. 3B is a diagram of a multi-window framework in accordance with aspects of the disclosure.

FIG. 3B is a diagram of a multi-window framework in accordance with aspects of the disclosure. In some aspects, the multi-view framework may be used to simultaneously display two or more applications.

As illustrated in FIG. 3B, in a platform 270, an activity manager 291, a window manager 292, and a view system 294 may interact with a multi window platform 400 via one or more Application Program Interface (API) calls.

An activity manager 291 serves to activate an application such that a plurality of applications is simultaneously performed. The window manager 292 draws or controls a plurality of windows, for example, touches, moves, or resizes the plurality of windows. A content provider 293 may enable an application to access data from another application or share a data thereof. A view system 294 serves to process a layout, a border, and a button of a single window and redraws an entire screen. A package manager 275 serves to process and manage an application. A telephony manager 276 serves to process and manage telephone communication. A resource manager 277 provides an access to a non-code resource, such as a localized character row, a graphic, a layout file, and the like. A location manager 278 serves to process and manage location information using a GPS. A notification manager 279 serves to process and manage an event generated in a system, for example, an alarm, a battery, and a network connection.

In some aspects, each of the activity manager 291, the window manager 292, the view system 294, and platform 400 may be implemented in software that is executed by controller 110 and/or another processor. The window manager 292 may be operable generate a title bar of each window. Further, the window manager 292 may search for the Z-order of each window or determine the Z-order between the windows according to the search. The multi window platform 400 may include a multi window manager 410 and a multi window service 420. The multi window manager 410 provides a function of the multi window service 420 in an API form to the user, and a Manager/Service structure may operate based on IPC. The multi window service 420 may trace lifecycles of applications executed with the multi window and manage a state of each application, such as a size, a position or the like.

The called API can manage a size, a position, and visibility of each window.

As described above, the framework according to the present invention may be implemented in a manner of providing the independent multi window framework and then calling the API.

Also, the application layer 260 may directly call the API from the multi window manager 410. That is, the user can use the API by receiving the API from the multi window manager 410 even when a new application is developed.

Figure 3C:
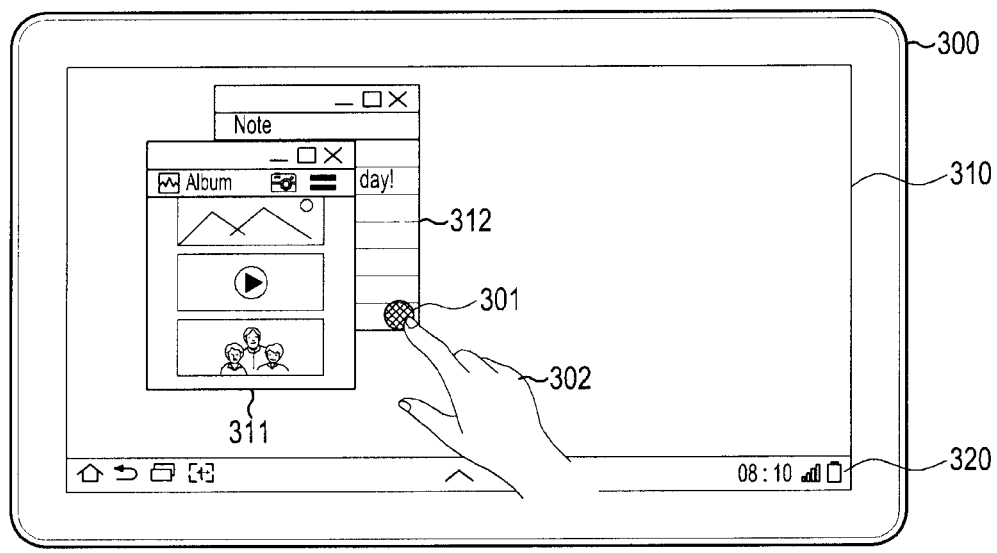
FIG. 3C and FIG. 3D are diagrams illustrating a technique for screen order change in accordance with aspects of the disclosure.
Figure 3D:
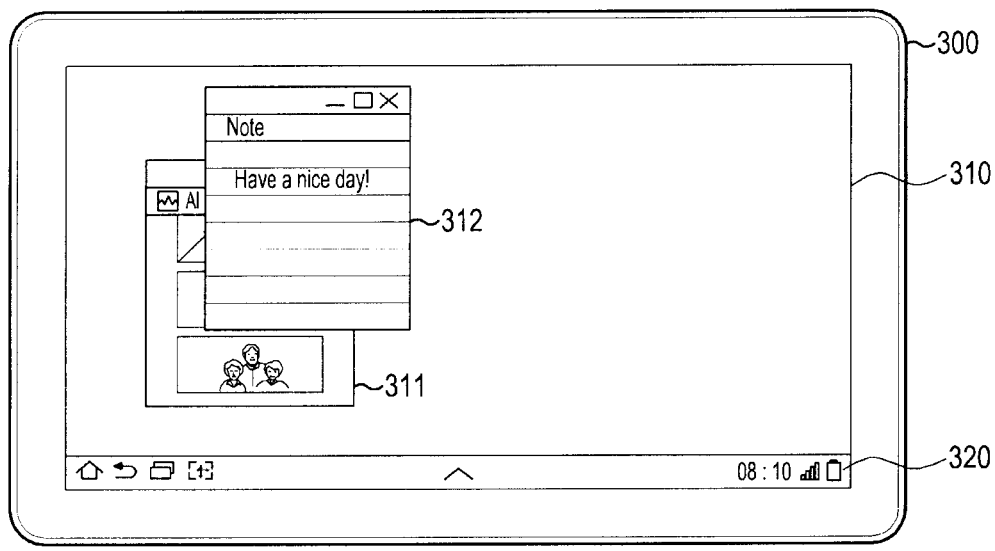
Figure 4A:
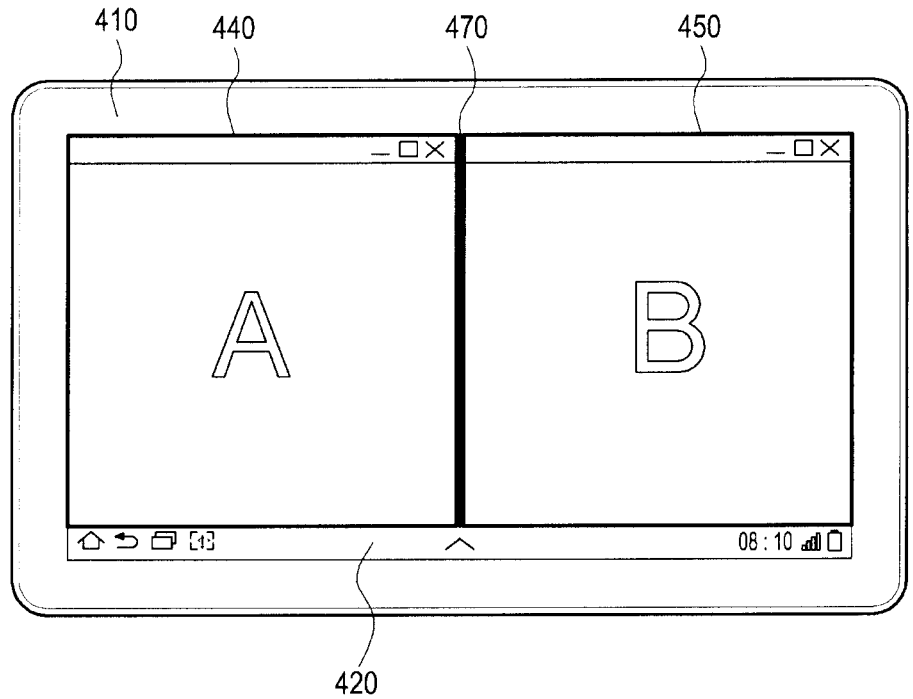
FIG. 4A and FIG. 4B are diagrams depicting the operation of a display device in a split mode in accordance with some aspects of the disclosure.
Figure 4B:
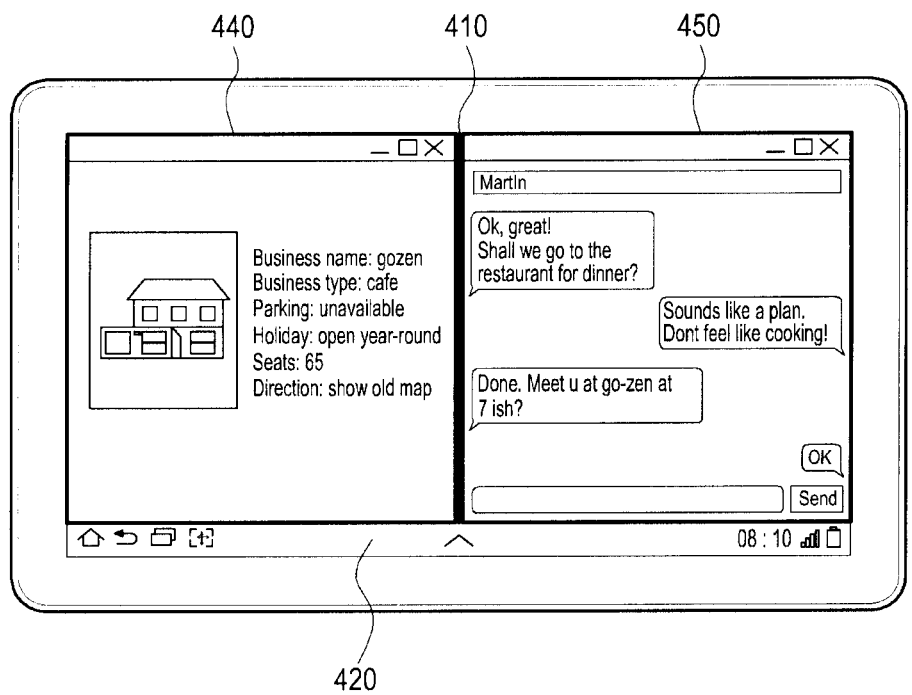

FIGS. 3C and 3D are diagrams illustrating a technique for screen order change in accordance with aspects of the disclosure. In the example of FIG. 3C, a user 302 may touch the window 312. Controller 110 may detect the touch and in turn give the highest display order to the window 312. Further, the controller 110 gives a next highest order to the window 311 being the window that had previously had the highest display order. That is, the controller 110 reduces the display order of the window 311 by one level when window 312 is touched. Thus in some aspects, the controller 110 may assign and reassign the display order of windows 311 and 312 so that it mirrors the order in which the two windows receiver user input. FIG. 3D illustrates the screen displaying windows 311 and 312 after display order of windows 311 and 312 has been changed. As illustrated in FIG. 3D, the window 312 having the highest display order may be at least partially superimposed on the window 311. FIGS. 4A and 4B are diagrams depicting the operation of a display device in a split mode in accordance with some aspects of the disclosure. In the example of FIG. 4A two applications are displayed in a main display screen 410 in a split mode. In the split mode, a first window 440 and a second window 450 may be displayed not to overlap with each other on the main screen 410. For example, as illustrated in FIG. 4A, the main screen 410 may be divided into two parts and the first window 440 is displayed in one part of the main screen 410 and the second window 450 in the other part of the main screen 410. The first window 440 and the second window 450 may be arranged right next to each other so that they share a common boundary 470, without overlapping.

Referring to FIG. 4B, an example is shown where a web browser application is executed in the window 440, while a messaging application is executed in the window 450. According to this example, a user may search for a desired restaurant through a web browser application executed in the window 440 on one touch screen 420 while making an appointment with a friend to have dinner at that restaurant. As illustrated in FIG. 4B, the user can search for information on the Internet by touching objects on the first window 440. Further, the user can talk to a friend through a message service by touching objects on the second window 450.

Figure 5:
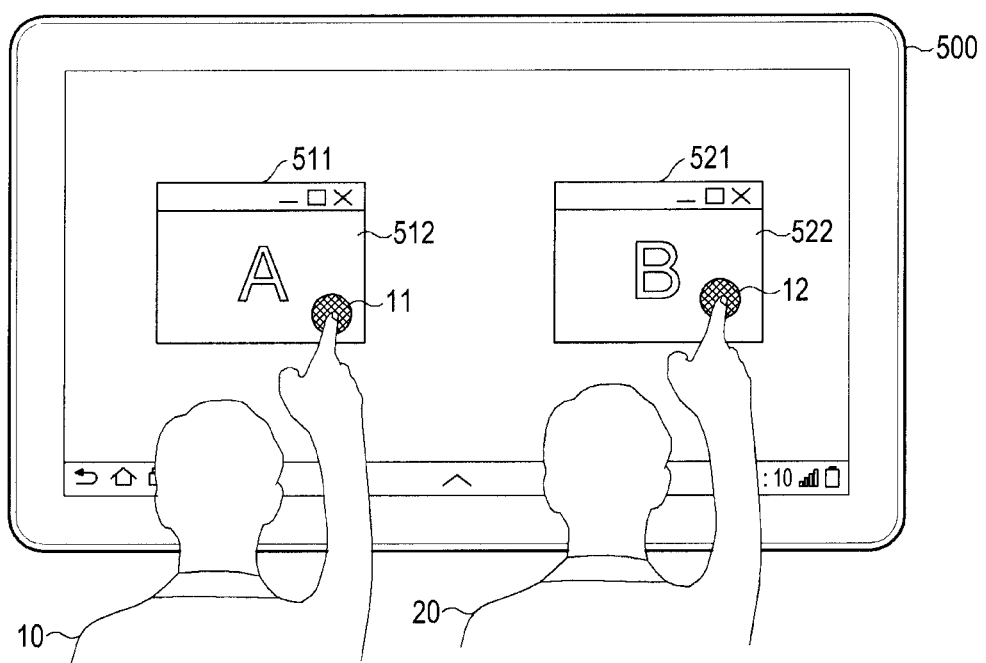
FIG. 5 is a diagram illustrating the operation of a display device in a freestyle mode in accordance with aspects of the disclosure.
Figure 6A:
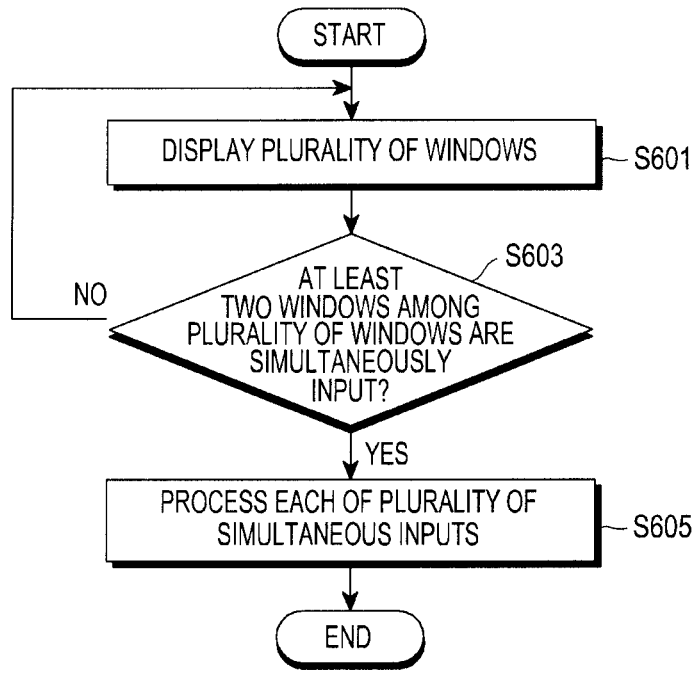
FIG. 6A is a flowchart of a method for controlling a display device according to aspects of the disclosure.
Figure 6B:
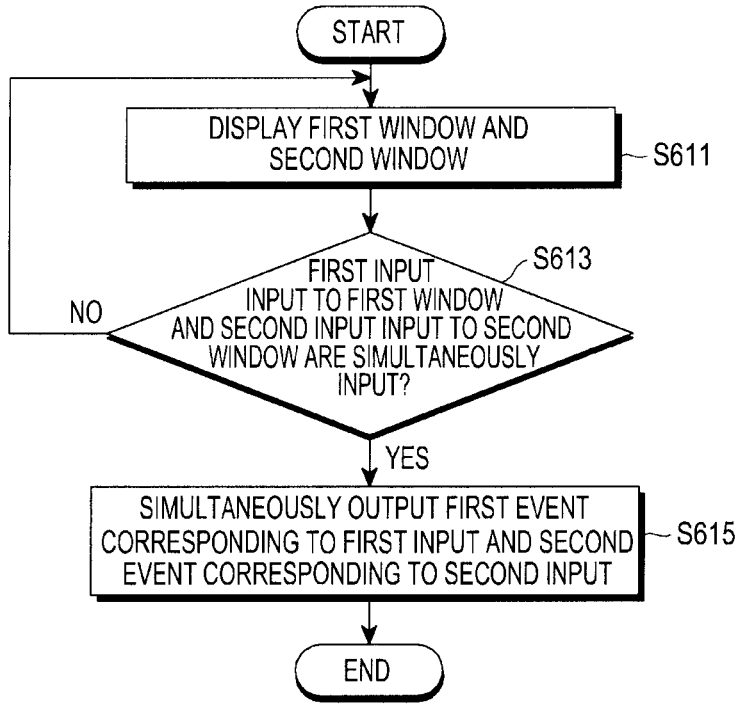
FIG. 6B is a flowchart of another method for controlling a display device according to aspects of the disclosure.

FIG. 5 is a diagram illustrating the operation of the display device in a freestyle mode in accordance with aspects of the disclosure. A first user 10 can input a first touch 11 into an application execution screen 511 of the first window. Further, a second user 20 can simultaneously input a second touch 12 into an application execution screen 512 of the second window. In some aspect, the input of two touches may be considered to be simultaneous when difference between an input time of the first touch 11 and an input time of the second touch 12 may be smaller than a predetermined threshold (e.g. 0.5 seconds). Meanwhile, as described above, when two touches are simultaneously input to the conventional display device, the window having the highest activity order receives both the first touch 11 and the second touch 12. FIG. 6A is a flowchart of a method for controlling the display device according aspects of the disclosure. The display device can display a plurality of windows each displaying an application in step S601. Meanwhile, the user can simultaneously input commands into two or more windows among the plurality of windows in step S603. When it is determined that the commands are simultaneously input to the two or more windows among the plurality of windows (S603—Y), the display device can dispatch of the inputs to its corresponding application. FIG. 6B is a flowchart illustrating a method of controlling the display device according to aspects of the disclosure. The display device can display the first window in which the first application is executed and the second window in which the second application is executed in step S611. The display device can determine whether the first input to the first window and the second input to the second window are simultaneously input in step S613. As described above, the simultaneous input may mean that a difference between input times of the first input and the second input is smaller than a preset threshold. When the first input and the second input are simultaneously input (S613—Y), the display device may output a first event corresponding to the first input and also outputs a second event corresponding to the second input in step S615.

Figure 7:
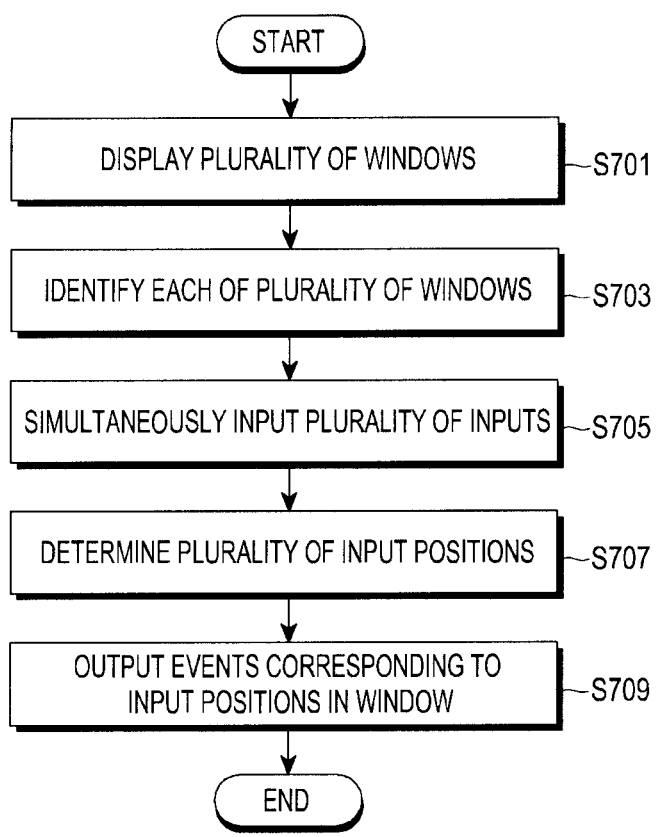
FIG. 7 is a flowchart of yet another method for controlling a display device according to aspects of the disclosure.

FIG. 7 is a flowchart illustrating a method of controlling the display device according to aspects of the disclosure. The display device (or processor thereof) can display a plurality of windows each executing an application in step S701. The display device can identify and manage a position of each of the plurality of windows S703. More specifically, the multi window manager 410 may maintain a record of the positions of the windows corresponding to the executed applications. In some implementation, the record may be stored in memory and for each application screen, it may identify a plurality of coordinates that are occupied by that screen. For example, the display device may maintain the record shown in Table 1.

TABLE 1

| Window index | Range of X axis coordinate values | Range of y axis coordinate values |
|---|---|---|
| 1 | 0~230 | 0~800 |
| 2 | 230~900 | 0~800 |
| 3 | 900~1280 | 0~800 |

As shown in Table 1, for example, the record may indicate that the first window has x-axis coordinate values ranging from 0 to 230 and y-axis coordinate values ranging from 0 to 800, the second window has x-axis coordinate values ranging from 230 to 900 and y-axis coordinate values ranging from 0 to 800, and the third window has x-axis coordinate values ranging from 900 to 1280 and y-axis coordinate values ranging from 0 to 800. In this example, the first window executes a first application, the second window executes a second application, and the third window executes a third application. Although in this example, the record includes coordinate values, in other examples, any suitable indication of window location may be used.

For example, in a situation where the multi window manager 410 receives a command for displaying a plurality of windows, the multi window manager 410 may assign the coordinate values shown in Table 1 to each of the plurality of windows and cause the display device to display the windows at the locations indicated by those values. Further, the multi window manager 410 can store and manage the given coordinate values. For example, when a window size change or a window position change is additionally input by the user, the multi window manager 410 can change at least one of a size and a position of the window in accordance with the corresponding command and then display the changed window. Alternatively, as the at least one of the size and the position of the window is changed, the multi window manager 410 can store and manage the coordinate value of the changed window.

Furthermore, user(s) can simultaneously input commands into two or more of the windows in step S705. For example, the user(s) can simultaneously input two commands as shown in Table 2. If two commands are not simultaneously input, individual touch inputs to each of windows are performed.

TABLE 2

| Command index | Input position | Command type |
|---|---|---|
| 1 | (23, 89) | Left direction drag gesture |
| 2 | (520, 700) | Right direction flick gesture |

In response to the commands being input, the display device (or processor thereof) can determine a plurality of input positions in step S707 that correspond to the plurality of commands. More specifically, the display device can identify that an input position of a first command is (23, 89) and an input position of a second command is (520, 700). The display device can control to output an event corresponding to the window corresponding to the input position in step S709. For example, the display device can identify that coordinates (23, 89) correspond to the input position of the first command are included in a display range of the first window and coordinates (520, 700) corresponding to the input position of the second command are included in a display range of the second window. Afterwards, the display device can control the event corresponding to a left direction drag gesture which is the first command to be dispatched to the first application and a right direction flick gesture which is the second command to be dispatched to the second application.

Figure 8A:
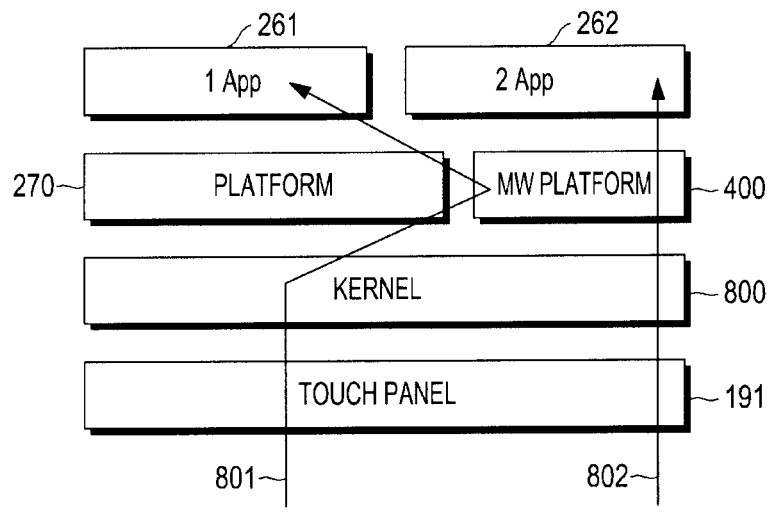
FIG. 8A and FIG. 8B are diagrams of systems for receiving user commands that are simultaneously input into a display device according to aspects of the disclosure.
Figure 8B:
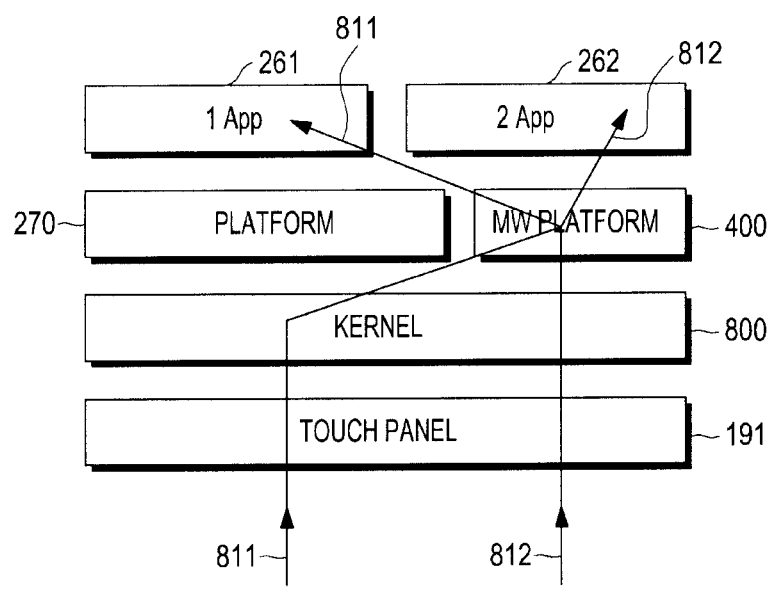

FIGS. 8A and 8B are diagrams of systems for receiving user commands that are simultaneously input into a display device according to aspects of the disclosure. Moreover, in the example of FIG. 8A, execution commands of the first application and the second application are input. A kernel 800 may manage a position of each of the first window executing the first application and the second window executing the second application. Additionally or alternatively, the kernel 800 may also maintain window information associated with each window. In some aspects, the window information may include coordinate information identifying an area on a touch panel 191 where the window is displayed. The kernel 800 may use this information, command input position, to determine the application to which the input command is to be dispatched. A first command 801 and a second command 802 may be input to the touch panel 191. The touch panel 191 may output the two input commands 801 and 802 to the kernel 800. The kernel 800 may match input positions of the first command 801 and the second command 802 with positions of the first window and the second window. In some aspects, the input position of a command may include one or more coordinates indicating where on the touch panel 191 the command has been entered.

The kernel 800 may determine to dispatch the first command 801 to the first application 261 and dispatch the second command 802 to the second application 262 based on a result of the matching. The kernel 800 may output the first command 801 and the second command 802 to a multi window platform 400 together with application information to be dispatched. The multi window platform 400 may dispatch the first command 801 input from the kernel 800 to the first application 261 and dispatch the second command 802 to the second application 262. That is, in the example of FIG. 8A, the kernel 800 may recognize the position information of the window (For example, coordinates value) displayed on the display device through communication with the multi window platform 400 and determine the dispatched application based on the input position of the input command. When a touch event occurs on a display device, the kernel checks the location where the touch event occurred, and can determine whether the touch event occurs on a first window or the second window by comparing the touch event with the position information of the displayed window. In some aspects, the kernel may include software that is executed by controller, such as controller 110.

In the example of FIG. 8B, the multi window platform 400 can manage the position of each of the first window executing the first application and the second window executing the second application. A first command 811 and a second command 812 may be input to the touch panel 191. The touch panel 191 may then provide the two input commands 811 and 812 to the kernel 800. The kernel 800 may then provide the first command 811 and the second command 812 to the multi window platform 400. The multi window platform 400 may manage window information on the executed application. The window information may include coordinate information and/or another indication of an area on touch panel 191 that is displaying the window. The multi window platform 400 may then determine the application to which the input command is to be dispatched based on the window information and the command input position. More specifically, the multi window platform 400 may be configured to match input positions of the first command 811 and the second command 812 with positions of the first window and the second window.

The multi window platform 400 can determine to dispatch the first command 811 to the first application 261 and dispatch the second command 812 to the second application 262 based on a result of the matching.

The multi window platform 400 can determine to dispatch the first command 811 to the first application 261 and dispatch the second command 812 to the second application 262. The multi window platform 400 may dispatch the first command 811 input from the kernel 800 to the first application 261 and dispatch the second command 812 to the second application 262. That is, in the example of FIG. 8B, the multi window platform 400 can manage the window information and determine the dispatched application based on the input position of the input command.

Figure 9A:
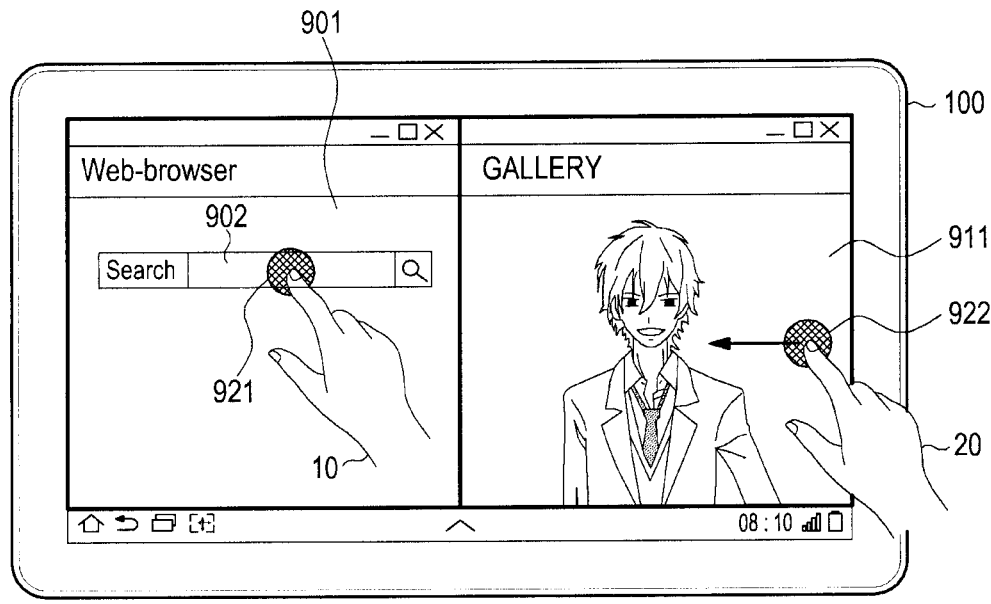
FIG. 9A, FIG. 9B and FIG. 9C are schematic diagrams of display devices in accordance with aspects of the disclosure.
Figure 9B:
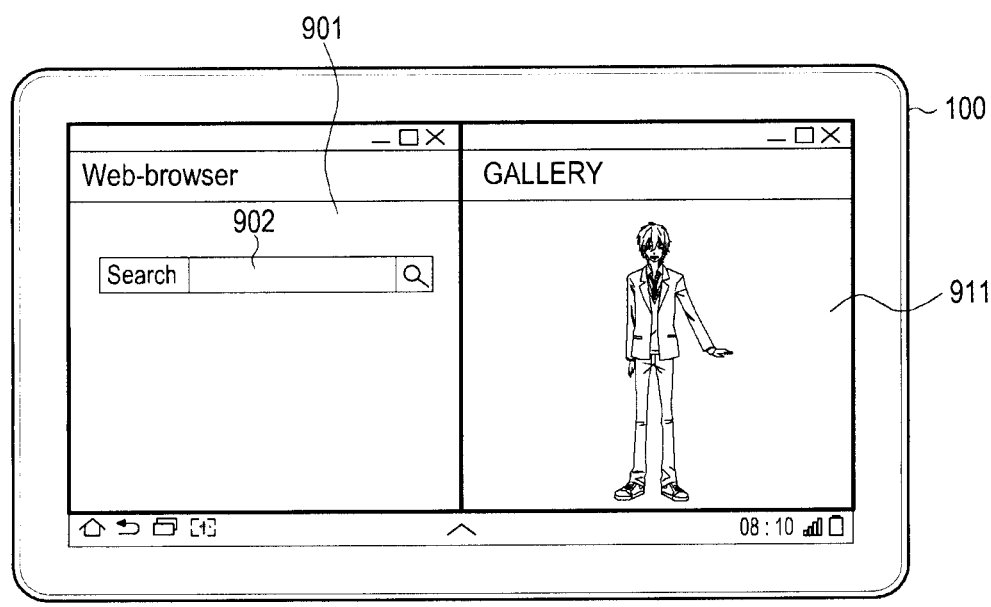
Figure 9C:
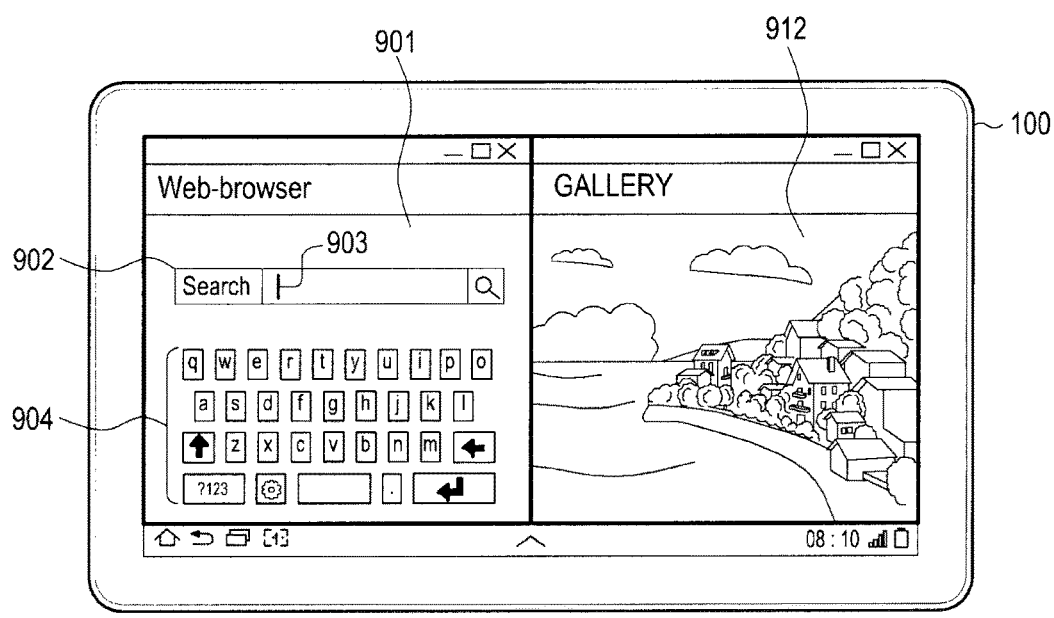

FIGS. 9A, 9B and 9C are schematic diagrams of display devices in accordance with aspects of the disclosure. In the example of FIG. 9A, the display device 100 displays a first window 901 executing a web browser and a second window 902 executing a gallery in the split mode. The first window 901 may include a search word input window object 902. The second window 901 may display a first image 911. A first user 10 may desire inputting a particular search word into the search word input window. Accordingly, the first user 10 can first input a touch gesture 921 to the search word input window object 902 in order to activate the search word input window. At the same time, the second user 20 may desire changing the first image 911 to another image and enjoying the changed image. Accordingly, the second user 20 may input a left direction flick gesture 922 of changing a display image. Meanwhile, the touch gesture 921 and the left direction flick gesture 922 may be simultaneously input.

In the example of FIG. 9B, a display device 100 provides both the touch gesture 921 and the left direction flick gesture 822 to an application having the highest activity order. In the embodiment of FIG. 9B, it is assumed that an activity order of a gallery application is higher than an activity order of a web browser application. Accordingly, the display device 900 according to the comparative example can dispatch both the touch gesture 921 and the left direction flick gesture 922 to the gallery application. The gallery application may recognize the touch gesture 921 and the left direction flick gesture 922 as a pinch-in gesture. Accordingly, the controller (not shown) may cause the first image 911 displayed in the gallery application to be reduced and then displayed.

In the example of FIG. 9C, the controller 110 may dispatch the touch gesture 921 to the web browser application and dispatches the left direction flick gesture 922 to the gallery application. The controller 110 can control to output an event corresponding to the touch gesture 921 to the first window and output an event corresponding to the left direction flick gesture 922 to the second window. More specifically, in accordance with the touch gesture 921, the controller 110 may display a cursor 903 on a search word input window 902 and additionally display a character input board 904. Further, the controller 110 may change the first image 911 to the second image 912 and then display the second image 912 in accordance with the left direction flick gesture 922. According to the above description, even when commands are simultaneously input with respect to a plurality of windows, an effect of independently processing the commands can be created. Meanwhile, controlling to output the event in the window may mean changing an execution screen of the corresponding application. Alternatively, outputting the event in the window may mean an output from the display device, not a change of the execution screen of the application. For example, it can be easily understood by those skilled in the art that there is no limitation in outputs of sound, light, or vibration from the display device and types of outputs such as data transmission.

The above-described embodiments according to the present disclosure can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the disclosure has presented certain specific examples, it will be understood by those skilled in the art that various changes in form and details may be made therein without departing from the spirit and scope of the disclosure as defined by the appended claims.

What is claimed is:

1. A method for controlling an electronic device, the method comprising:
    displaying, on a touch screen display of the electronic device, a first window executing a first application and a second window executing a second application, wherein the first application displays a picture;
    detecting, at the touch screen display, a first touch gesture on a first point of the touch screen display and a second touch gesture on a second point of the touch screen display;
    outputting a first event corresponding to the first touch gesture and the second touch gesture when the first point and the second point are inside of the first window, wherein the first event comprises adjusting a size of the picture according to the first touch gesture and the second touch gesture while maintaining a size of the first window; and
    outputting a second event corresponding to the first touch gesture and a third event corresponding to the second touch gesture when the first point is inside of the first window and the second point is inside the second window, wherein the second event comprises moving the picture according to the first touch gesture,
    wherein the second window is displayed prior to the first touch gesture on the first point of the touch screen display.

2. The method of claim 1, wherein displaying the first window and the second window comprises:
    determining positions of the first window and the second window;
    storing the determined positions of the first window and the second window in a memory; and
    displaying the first window and the second window based on the determined positions.

3. The method of claim 2, further comprising:
    matching the stored position of the first window with the first point and the second point; and
    determining whether the first point or the second point is inside or outside of the first window based on the matching result.

4. The method of claim 1, further comprising:
    determining that the first touch gesture and the second touch gesture are received simultaneously when a difference between a time when the first touch gesture is received and a time when the second touch gesture is received is smaller than a threshold.

5. The method of claim 4, wherein the first event or the second event is outputted when the first touch gesture and the second touch gesture are received simultaneously.

6. An electronic device comprising:
    a touch screen display; and
    a controller configured to:
    control to display a first window executing a first application and a second window executing a second application, wherein the first application displays a picture in the first window,
    detect, on the touch screen display, a first touch gesture on a first point of the touch screen display and a second touch gesture on a second point of the touch screen display,
    control to output a first event corresponding to the first touch gesture and the second touch gesture when the first point and the second point are inside the first window, wherein the first event comprises adjusting a size of the picture according to the first touch gesture and the second touch gesture while maintaining a size of the first window, and
    control to output a second event corresponding to the first touch gesture and a third event corresponding to the second touch gesture when the first point is inside of the first window and the second point is inside the second window, wherein the second event comprises moving the picture according to the first touch gesture,
    wherein the second window is displayed prior to the first touch gesture on the first point of the touch screen display.

7. The electronic device of claim 6, wherein the controller is further configured to determine positions of the first window and the second window, store the determined positions of the first window and the second window, and control to display the first window and the second window based on the determined positions of the first window and the second window.

8. The electronic device of claim 7, wherein the controller is further configured to match the stored position of the first window with the first point and the second point and determine whether the first point or the second point is inside or outside of the first window based on the matching result.

9. The electronic device of claim 6, wherein the controller is further configured to determine that the first touch gesture and the second touch gesture are input simultaneously, when a difference between a time when the first touch gesture is input and a time when the second touch gesture is input is smaller than a threshold.

10. The electronic device of claim 9, wherein the controller is further configured to control to output the first event or the second event when the first touch gesture and the second touch gesture are received simultaneously.

11. An electronic device, comprising:
a touch screen display; and
a controller configured to:
- detect a command for displaying multiple applications including a first application and a second application,
- in response to detecting the command, control to display a first window executing the first application and a second window executing the second application on substantially entire portion of the touch screen display, wherein the first window and the second window are non-overlapping and the first window and the second window share a borderline,
- detect, at the touch screen display, a first touch gesture on a first point of the touch screen display and a second touch gesture on a second point of the touch screen display,
- control to output a first event corresponding to the first touch gesture and the second touch gesture when the first point and the second point are inside of the first window while maintaining a location and a size of the first and second window, and
- control to output a second event corresponding to the first touch gesture and a third event corresponding to the second touch gesture when the first point is inside of the first window and the second point is inside the second window, wherein the second window is displayed prior to the first touch gesture on the first point of the touch screen display.

12. The electronic device of claim 11, wherein the controller is further configured to:
- determine positions of the first window and the second window;
- control to store the determined positions of the first window and the second window in a memory; and
- control to display, on the touch screen display, the first window and the second window based on the determined positions.

13. The electronic device of claim 12, wherein controller is further configured to match the stored position of the first window with the first point and the second point and determine whether the first point or the second point is inside or outside of the first window based on the matching result.

14. The electronic device of claim 11, wherein the controller is further configured to determine that the first touch gesture and the second touch gesture are input simultaneously, when a difference between a time when the first touch gesture is input and a time when the second touch gesture is input is smaller than a threshold.

15. The electronic device of claim 14, wherein the controller is further configured to control to output the first event or the second event when the first touch gesture and the second touch gesture are received simultaneously.

* * * * *